(12) United States Patent
Bendix et al.

(10) Patent No.: US 6,179,893 B1
(45) Date of Patent: Jan. 30, 2001

(54) PROCESS FOR GENERATION OF FERTILIZER GRANULES CONTAINING UREA AND AMMONIUM SULFATE

(75) Inventors: Horst Bendix; Heinz Lange, both of Lutherstadt Wittenberg; Klaus Schübel, Reinsdorf; Hans-Joachim Wachsmuth, Mühlanger, all of (DE); Tetsuzo Honda, Urayasu (JP); Eiji Sakata, Yotsukaido (JP); Genshi Nishikawa, Chiba (JP)

(73) Assignee: Toyo Engineering Corporation, Tokyo (JP)

( * ) Notice: Under 35 U.S.C. 154(b), the term of this patent shall be extended for 0 days.

(21) Appl. No.: 09/330,473

(22) Filed: Jun. 11, 1999

(30) Foreign Application Priority Data

Jun. 15, 1998 (DE) .............................................. 198 26 570

(51) Int. Cl.$^7$ ............................... C05C 9/00; C05D 9/00; C05G 5/00
(52) U.S. Cl. ........................ 71/28; 71/30; 71/61; 71/63; 71/64.03
(58) Field of Search .................................. 71/28, 30, 61, 71/63, 64.03

(56) References Cited

U.S. PATENT DOCUMENTS

| | | |
|---|---|---|
| 3,785,796 | 1/1974 | Mann, Jr. . |
| 3,928,015 * | 12/1975 | Siegel et al. ............................ 71/28 |
| 4,943,308 | 7/1990 | Vanmarcke et al. . |
| 5,779,945 * | 7/1998 | Nijsten et al. ............................ 264/7 |

FOREIGN PATENT DOCUMENTS 0 289 074   11/1988   (EP) .

\* cited by examiner

*Primary Examiner*—Tom Dunn
*Assistant Examiner*—Elin A Warn
(74) *Attorney, Agent, or Firm*—Flynn, Thiel, Boutell & Tanis, P.C.

(57) ABSTRACT

There is disclosed a process to produce fertilizer granules containing urea and ammonium sulfate with a high ammonium sulfate concentration of $\leq 60$ wt. % in a fluidized bed granulator, which process comprises the steps of: a) a molten urea suspension consisting of ammonium sulfate having an average particle size of 30 to 300 $\mu$m and urea having a temperature range of 120 to 155° C. is produced, b) the molten urea suspension produced at the stage a) is then injected from below on the fine particles of urea/ammonium sulfate in a fluidized bed granulator by means of at least a nozzle, while the fluidized bed is loosened by a spouting air flow in the injection area, and subsequently, c) the fertilizer granules generated in the fluidized bed are separated and, if necessary, treated. Homogeneous urea/ammonium sulfate granules of an ammonium sulfate content between 30 and 60 wt. % can be produced this way without any problems, while the particle size of granules can be adjusted selectively and dust emissions by granulation can be reduced to a minimum.

25 Claims, 2 Drawing Sheets

PROCESS FOR GENERATION OF FERTILIZER GRANULES CONTAINING UREA AND AMMONIUM SULFATE

FIELD OF THE INVENTION

This invention concerns a process to produce fertilizer granules containing urea and ammonium sulfate of a high ammonium sulfate concentration in a fluidized bed granulator.

BACKGROUND OF THE INVENTION

In addition to nitrogen, phosphor and potassium as main fertilizer components, the use of sulfur is increasing in importance in agriculture. Based on the environmental law, sulfur emissions from burning fossil materials have been drastically reduced in the last decade, which in the past represented an essential part of soil supply with sulfur. Moreover, besides ammonium sulfate, in the meantime almost no cheaper fertilizers have been available at the market. However, the use of it alone causes also a considerably bad nitrogen/sulfur relation which is compensated only because of its low price. Furthermore, a large part of ammonium sulfate is used in the form of fine crystals as wastes from the caprolactam industry, and it leads to bad storing and delivery properties of the related fertilizers.

Based on the fact that the production rate of ammonium sulfate from caprolactam processes continuously becomes less by process development and environmental loads due to sulfur emissions are to be kept absolutely small, an obvious demand for the cost-efficiently producible fertilizer granules having the optimal nitrogen/sulfur relation as well as good storing and delivery properties is recognizable on the market. The combination of urea with ammonium sulfate offers quite good prerequisites so that work has been done since several years to develop such a fertilizer.

The production of granules containing urea and ammonium sulfate is not a problem because of the properties of ammonium sulfate or urea/ammonium sulfate mixture. Ammonium sulfate melts at over 500° C. so that the granulation of a mixed molten urea solution having a high ammonium sulfate content is excluded. Ammonium sulfate is soluble in a molten urea solution at usual molten urea temperature only up to about 20 wt. % and it can be therefore granulated homogeneously. If a higher ammonium sulfate content is required, so only compaction, granulation from solutions or granulation of ammonium sulfate/urea slurries are taken into consideration. Since the compaction process is excluded from the bulk market and the granulation process from solutions is unacceptably expensive and at the same time the ammonium sulfate content of more than 20 wt. % is desirable because of good application properties, the former proposals for solution have been based on the granulation of proper slurries. In this connection, an essential problem is that in case of an ammonium sulfate content of more than 60 wt. %, the granulation temperature of those slurries rises very quickly, and this shall be avoided because of the extremely strong formation of vegetable poison, biuret, from urea.

From the U.S. Pat. No. 3,785,796 a process to produce ammonium sulfate urea granules is known with which it is generally possible to produce granules having an ammonium sulfate content of 30 to 70 wt. %. In this case, commercial ammonium sulfate not milled is mixed with a molten urea solution and granulated in an "oil" or "dish" granulator, while the related slurry is dropped down. Both granulator types have the merit that they work in a quasi-dustfree manner so that a dust return can be deleted.

Disadvantageous to this process is the fact that granules have low quality due to their inhomogeneous structure caused by the granulation process. Furthermore, the "dish" and "oil" granulators have not been used in fertilizer granulation processes because their operating costs are relatively large, and it is difficult to achieve large production units by these processes. Finally it is also disadvantageous that the range of "granulation capability" of urea ammonium sulfate slurries mentioned in the U.S. Pat. No. 3,785,796 is adequate only for coarse-crystalline ammonium sulfate and cannot be technically realized with ammonium sulfate of smaller particle size.

According to EP-A 0 289 074, a process to produce urea ammonium sulfate granules of an ammonium sulfate concentration of 15 to 50 wt. % is described by which the ammonium sulfate granules introduced into the fluidized bed are sprayed by a liquid which contains 70 to 99.9 wt. % urea.

Demerits of this process are the inhomogeneity of ammonium sulfate and urea, necessity of using expensive ammonium sulfate coarse-crystals hardly available on the market and the impossibility to produce a granule diameter larger than 3 mm, as it is preferred by modern agriculture. The presented alternatives to the use of compacted ammonium sulfate of a larger basic diameter require a second forming stage which leads to extremely high operating costs.

According to U.S. Pat. No. 4,943,308, a process to produce ammonium sulfate urea granules of an ammonium sulfate content of 15 to 30 wt. % in the fluidized bed is disclosed. In this case, ammonium sulfate is dissolved in a 75 to 85 wt. % urea solution, concentrated to 92 to 97 wt. % and atomized by means of air after addition of granulation additives. In this process the maximum ammonium sulfate content of granules is limited by the maximum solubility of ammonium sulfate in the urea solution. Claimed is therefore only a maximum ammonium sulfate concentration of 30 wt. %.

Furthermore, as for this process it is also disadvantageous that in spite of the addition of crystallization aids which should reduce dust formation, considerable emission arises. Also according to the comparison experiment mentioned in this patent in which ammonium sulfate is mixed with a 95 wt. % urea solution by adding granulation aids and the ammonium sulfate is milled before granulation, the 30 wt. % ammonium sulfate content is not exceeded. Finally in this process two-material nozzles are used, while the atomization of slurries is done by means of highly compacted air. Since the mists generated so have a preferable bulk-specific diameter of 30 to 60 $\mu$m, ammonium sulfate granules must be milled quite finely so that they are wetted sufficiently with liquid and solid ammonium sulfate granules are not separated from mists because of density difference to the urea solution.

Moreover, the described process functions only because a large part of ammonium sulfate is dissolved in the 95 wt. % urea solution because of a low ammonium sulfate concentration. In spite of the relatively high portion of dissolved ammonium sulfate in the slurry, a large quantity of ammonium sulfate (about 17 wt. %) is lost as emissions. If these emissions are recycled to the slurry surge tank, the viscosity of the suspension increases to such an extent that in case of an ammonium sulfate content >30 wt. %, the process is interrupted due to plugging.

SUMMARY OF THE INVENTION

This invention was therefore subjected to the task to create a process to produce fertilizer granules containing urea and ammonium sulfate of an ammonium sulfate content of <60 wt. %, which does not show the above-mentioned demerits according to the present status of technology and enables the production of a homogeneous urea/ammonium sulfate granule of a relatively high ammonium sulfate content which indicates good properties concerning application and is at the same time producible with low technical expenses and cost-efficiently.

Other and further objects, features, and advantages of the invention will appear more fully from the following description, taken in connection with the accompanying drawings.

DETAILED DESCRIPTION OF THE INVENTION

Figure 1:
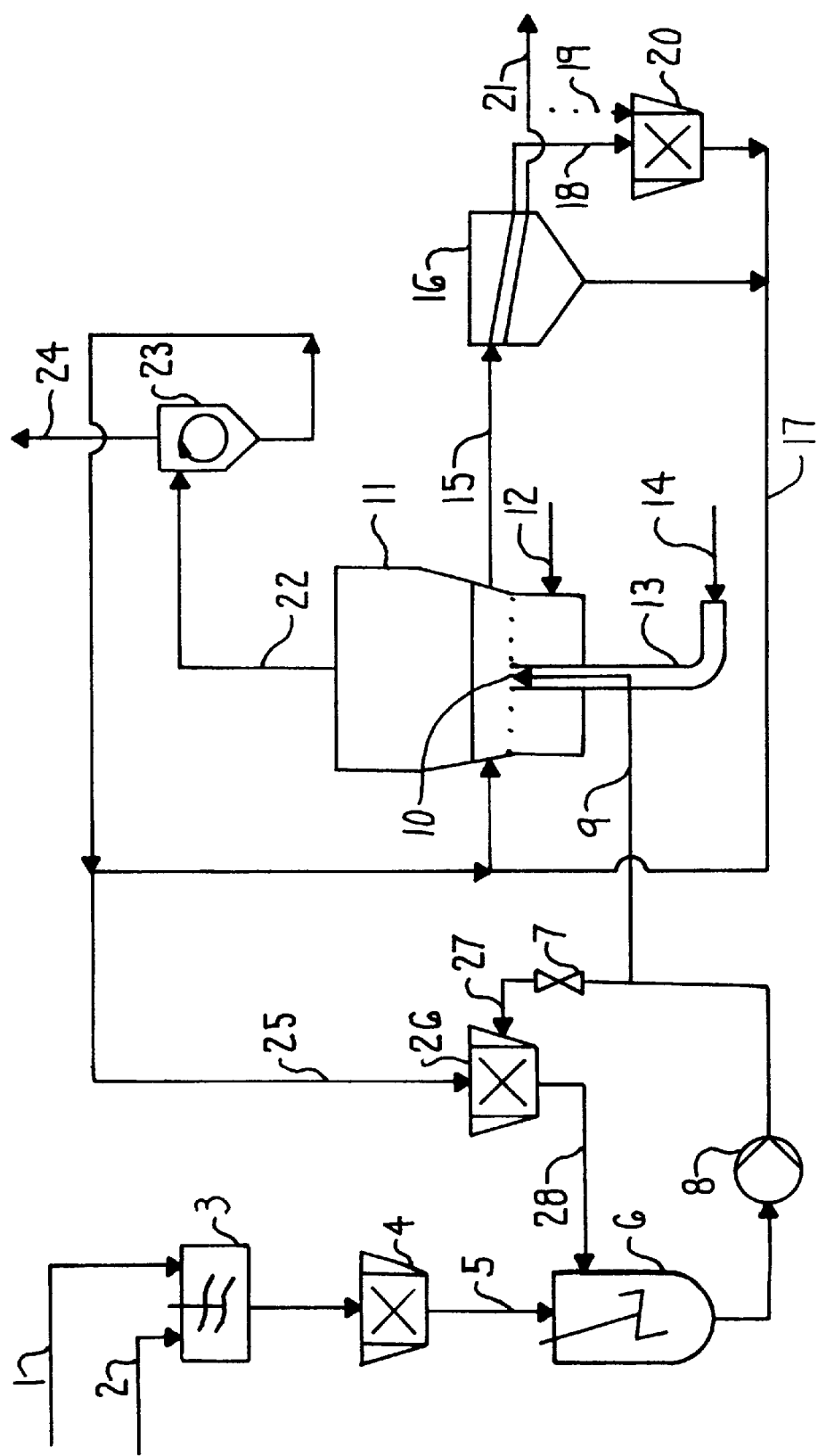
FIG. 1 is a flow chart of an embodiment of the present invention.

This task has been achieved by the invention as follows:

A process to produce fertilizer granules containing urea and ammonium sulfate with an ammonium sulfate concentration of ≦60 wt. %, to be characterized by that a) a molten urea suspension consisting of ammonium sulfate having an average particle size of 30 to 300 μm and urea having a temperature range of 120 to 155° C. is produced, b) the molten urea suspension produced at the stage a) is then injected from below on the fine particles of urea/ammonium sulfate in a fluidized bed granulator by means of at least a nozzle, while the fluidized bed is loosened by a spouting air flow in the injection area, and subsequently, c) the fertilizer granules generated in the fluidized bed are separated and, if necessary, treated.

It is shown unexpectedly that homogeneous urea ammonium sulfate granules of an ammonium sulfate content of max. 60 wt. % can be produced this way without any problems, while the particle size of granules can be adjusted selectively. Furthermore, dust emissions by granulation can be reduced to a minimum this way although it was also unforeseeable.

The process according to this invention includes thus at least three reaction stages.

At the first reaction stage a) a molten urea suspension consisting of ammonium sulfate and urea in a temperature range between 120 and 155° C. is produced, while the ammonium sulfate has an average particle size between 30 and 300 μm. The medium particle size means the average particle size subsequently determined by screen analysis. Concerning the particle size of ammonium sulfate, it was found that the concentration range in which ammonium sulfate can be given to molten urea depends on the particle size of ammonium sulfate and decreases with the diminishing particle size due to an increase in viscosity.

The production of the molten urea suspension containing ammonium sulfate and urea is unproblematic and can be conducted in various ways. For example, preheated ammonium sulfate of a preferable temperature of 100 to 150° C. can be also introduced into the proper molten urea at a temperature of 120 to 150° C. and subsequently dispersed. In this case, the ammonium sulfate shows preferably a mean particle size between 60 and 150 μm and the molten urea shows a concentration of >90 wt. %.

Another possibility of producing the molten urea suspension containing ammonium sulfate and urea is that coarse-grained and preheated ammonium sulfate of a preferable temperature between 100 and 150° C. is introduced into the proper molten urea, and the produced molten urea is milled to the medium particle size between 30 and 300 μm by means of a wet mill and subsequently dispersed. The coarse-grained ammonium sulfate preferably shows in this case an average particle size between 0.1 and 2.0 mm. According to a preferred design, the ammonium sulfate at the stage a) is introduced into the molten urea by highly turbulent dispersion. By this highly turbulent dispersion the viscosity of the ammonium sulfate/urea suspension can be reduced up to ≦150 cP by introducing kinetic energy by a usual dispergator and can be kept low for a sufficiently long time until atomization even in case of a large solid matter content.

At the second reaction stage b) the molten urea suspension generated at the stage a) is then sprayed by means of a spray nozzle from below to fine ammonium sulfate urea particles, which preferably show a mean particle size of 1.0 to 3.0 mm, in a fluidized bed granulator.

It has been proved especially advantageous that the atomization of ammonium sulfate/urea suspension takes place by means of single material spray nozzles. These nozzles, especially preferably in the form of full cone spray nozzles, have the merit that relatively large mists of a mean diameter of preferably 250 to 500 μm are produced so that relatively large ammonium sulfate particles may be included. By means of these single material spray nozzles, a relatively large spraying angle can also be realized so that the fluidized bed is wetted optimally by a small number of nozzles and mists are distributed uniformly in the fluidized bed. In case of too large mist density, agglomerates, i.e. granulation particles adhered to each other, are produced. The maximum wetting, by which agglomerates have not yet been produced, depends on the nozzle type, spray figure and shape of the fluidized bed besides the material properties of molten urea suspension. Preferred are therefore full cone nozzles having a spray angle of 45 to 90 degrees, preferably 60 to 80 degrees, while the nozzles are supplied preferably with 100 to 1,000 kg/h of molten urea suspension.

The height of the fluidized bed can be varied in a wide range, but it has been proved especially advantageous to adjust the fluidized bed height between 300 and 600 mm. The fluidized bed height <300 mm reduces the agglomeration rate, but there is a danger of blowing mists through the fluidized bed, which leads to an increase in dust formation in the granulator. In case of the fluidized bed height >600 mm, there is such a danger that the upper layers are no longer sprayed on so that only unnecessary energy is used to compress the fluidized bed.

In case of carrying out the reaction stage b), it is also essential to the invention that the fluidized bed is loosened in the injection area by a spouting air flow without atomizing mists of molten urea suspension. This loosening effect is preferably achieved by that the molten urea nozzles are covered with the spouting air flow which has preferably a velocity of 0.75 to 1.5 times that of the molten urea suspension mists leaving the single material spray nozzle and is especially injected in a ratio of 0.75:1 to 1.5:1 $Nm^3/h$ per kg molten urea suspension.

At the third reaction stage c) the fertilizer granules produced in the fluidized bed are separated and, if necessary, treated. According to a preferable design case, the fertilizer granules are divided by usual equipment into three particle fractions, i.e. into the undersize granules with a particle size <1.0 mm, especially <1.6 mm, the normal size granules with a particle size of 1.0 to 5.0 mm, especially 1.6 to 5.0 mm, and the oversize granules with a particle size >5 mm. In case of this preferred process variation, undersize granules are recycled to the fluidized bed reactor according to the stage b), and in this case, these undersize granules are preferably returned to the fluidized bed reactor below the top of the fluidized bed. Oversize granules may be milled, if necessary, together with normal size granules to a preferred mean particle size of 1.0 to 3.0 mm and returned to the fluidized bed granulator like undersize granules. Normal size granules having a preferred particle size of 1.6 to 5.0 mm can be subjected with oil/paraffin to a final hydrophobic treatment by usual methods and sold as a final product in this form.

As it could be found by our own tests, solid ammonium sulfate particles are separated from molten urea suspension mists in spite of their large size during granulation operation at the stage b) and arrive in the outgoing air. With the increasing particle size of dust particles their ammonium sulfate content also rises. Especially, the dust particles of which the diameter is above the mean particle size of fine ammonium sulfate particles of preferably 30 to 200 $\mu$m, especially 60 to 150 $\mu$m, show a considerably higher ammonium sulfate content than the final product granulates do. If this dust is circulated to the surge tank for atomizing the molten urea suspension, so it leads to the concentration of the molten urea suspension by increasing the ammonium sulfate content. The repeated atomization of the molten urea suspension enriched with large ammonium sulfate particles sharpens this effect more. In case of a long operation time, this enrichment mechanism leads to an increase in viscosity, which causes plugging of piping and nozzles. The molten urea suspension loses its granulation capability, and this undesirable effect already can appear at the desired ammonium sulfate content of 40 wt. %.

According to a preferable design, this problem can be solved by that the dust produced at the granulation stage b) is cleaned into a fine ammonium sulfate lean and coarse ammonium sulfate rich fraction by dry scrubbers, cyclones or usual dust filters. The ammonium sulfate lean fraction having an ammonium sulfate content of preferably ≦60 wt. % and a preferable particle size ≦50 $\mu$m, is separated by a wet scrubber according to the above-mentioned design variation and excluded from the process. The ammonium sulfate rich coarse dust fraction with an ammonium sulfate content of preferably >60 wt. % and a particle size >50 m, is returned direct to the fluidized bed of the granulator and/or united with the urea/ammonium sulfate suspension before the granulation stage b) after wet milling of coarse-grained ammonium sulfate particles to a mean particle size of preferably 30 to 300 $\mu$m, especially 60 to 150 $\mu$m. According to a preferred design variation, the milled ammonium sulfate rich dust fraction is added to the urea/ammonium sulfate suspension in the surge tank for atomization.

When returning the ammonium sulfate rich dust fraction to the fluidized bed granulator, which preferably takes place in the area below the top of the fluidized bed, it was found that a part of the dust entering the fluidized bed adhered to the thick molten urea suspension layer of granules made of large mists and so it was taken away from the enrichment mechanism, while the other part of dust functioned as a seed from which granules were made.

When milling the returned ammonium sulfate rich dust fraction, it results in that especially large ammonium sulfate particles are crushed before atomizing and remain in molten urea suspension mists at atomizing, which prevents further enrichment of ammonium sulfate.

The invented process proves to be especially advantageous if a part of ammonium sulfate rich dust fraction is returned to the fluidized bed granulator and at the same time the other part of this dust fraction is milled with the molten urea suspension and dispersed. In this way the particle size of granules can be controlled optimally without making it necessary to mill normal size granules. Furthermore, the portion of the dust to be returned is considerably reduced thereby so that contrary to the ammonium sulfate concentration in the product, that in the molten urea suspension increases not more than 3 wt. %.

By means of the invented process homogeneous urea/ammonium sulfate granules having a preferred particle size of 1.6 to 5.0 mm and an ammonium sulfate content between 30 and 60 wt. % as well as good storing and delivery properties can be produced in a technically simple way and therefore cost-effectively. Since the process works gently to the environment thanks to its comprehensive dust circulation, it is especially adequate for execution in commercial plants.

The following examples and figures should further illustrate the invented process, but the invention is not limited to them.

EXAMPLES

Example 1

The process variation according to Example 1 corresponds with the process shown in FIG. 1.

413 kg/h ammonium sulfate with a mean particle size of 0.9 mm are sent with a temperature of 125° C. to a multichamber dispergator 3 through the line 1 and mixed there with 402 kg/h molten urea fed through the line 2 at a temperature of 140° C. and sent together direct to the wet mill 4. In the wet mill with triple rotor-stator combination the milling of ammonium sulfate to a mean diameter $d_{50}$ of 110 $\mu$m takes place, and with the circumferential speed of rotors of 40 m/s the dispersing of ammonium sulfate until the low viscous phase takes place.

This ammonium sulfate/urea suspension is sent direct to the pump surge tank 6 through the line 5 and it is sent by a pump 8 from there to the nozzle 10 through the line 9. By means of the pressure control valve 7 an admission pressure of 3.5 bar is adjusted. A single material spray nozzle 10 sprays 875 kg/h molten urea suspension into the fluidized bed of the granulator 11. The full cone nozzle 10 creates a mean mist diameter of 370 $\mu$m at a spraying angle of 61 degrees. The nozzle is arranged in the height of the sieve tray on which the fluidized bed is formed and sprays with a velocity of 29 m/s from below into the bed which has a height of 350 mm.

By feeding 3,000 Nm$^3$/h ground air through the duct 12 the fluidized bed of an empty tube velocity of 1.8 m/s is generated. The nozzle 10 is arranged in a spouting air pipe 13 where 900 Nm$^3$/h spouting air are fed through the line 14 at a velocity of 20 m/s to loosen the fluidized bed in the injection place. Granules having a mean diameter of 3.2 mm are discharged through the chute 15 and sent to the screen 16 where products are divided into three fractions.

350 kg/h fine products <2.5 mm are recycled through the conveyor gallery 17 to the granulator below the top of the fluidized bed and build the fluidized bed. 30 kg/h oversize products (>5 mm) and 20 kg/h normal size products (2.5 to 5.0 mm) are fed to the roll type crusher 20 through the lines 18 and 19 and milled into seeds having a mean diameter of 1.6 mm, which are also returned like fine products to the fluidized bed of the granulator 11. 810 kg/h final products with an ammonium sulfate concentration of 50.6 wt. % and a mean particle size of 3.8 mm are delivered through the conveyor gallery 21 after hydrophobic treatment with oil/paraffin.

The waste air generated in the granulator 11 is sent through the duct 22 to the cyclone 23 where 60 kg/h dust with a concentration of 82 wt. % ammonium sulfate are separated. 5 kg/h dust with an ammonium sulfate concentration of 60 wt. % and a particle size <60 μm out of the cyclone outlet air are sent through the line 24 to a wet scrubber (not shown).

The dust separated in the cyclone is fed through the conveyor gallery 25 to the wet mill 26 where ammonium sulfate particles are milled highly turbulently into a mean diameter of 100 μm in the ammonium sulfate/urea suspension circulated through the line 27. The highly concentrated ammonium sulfate/urea suspension is sent to the surge tank 6 through the line 28.

Example 2

The process according to Example 2 runs as described in Example 1, only that a part of the highly concentrated ammonium sulfate dust separated in the cyclone 23 is introduced 250 mm below the top of the fluidized bed. 20 kg/h of 60 kg/h ammonium sulfate rich dust separated in the cyclone 23 are introduced direct into the granulator 11. Consequently the mean particle size of the produced granules sinks from 3.8 to 3.4 mm, and the feed of 20 kg/h normal size products from the crusher 20 is deleted. The dust rate sent to the wet mill 26 is reduced to 40 kg/h so that only 855 kg/h molten urea suspension must be atomized. The ammonium sulfate content of the molten urea suspension which is conveyed to the nozzles is reduced from 52.8 to 52.2 wt. %.

Example 3

Figure 2:
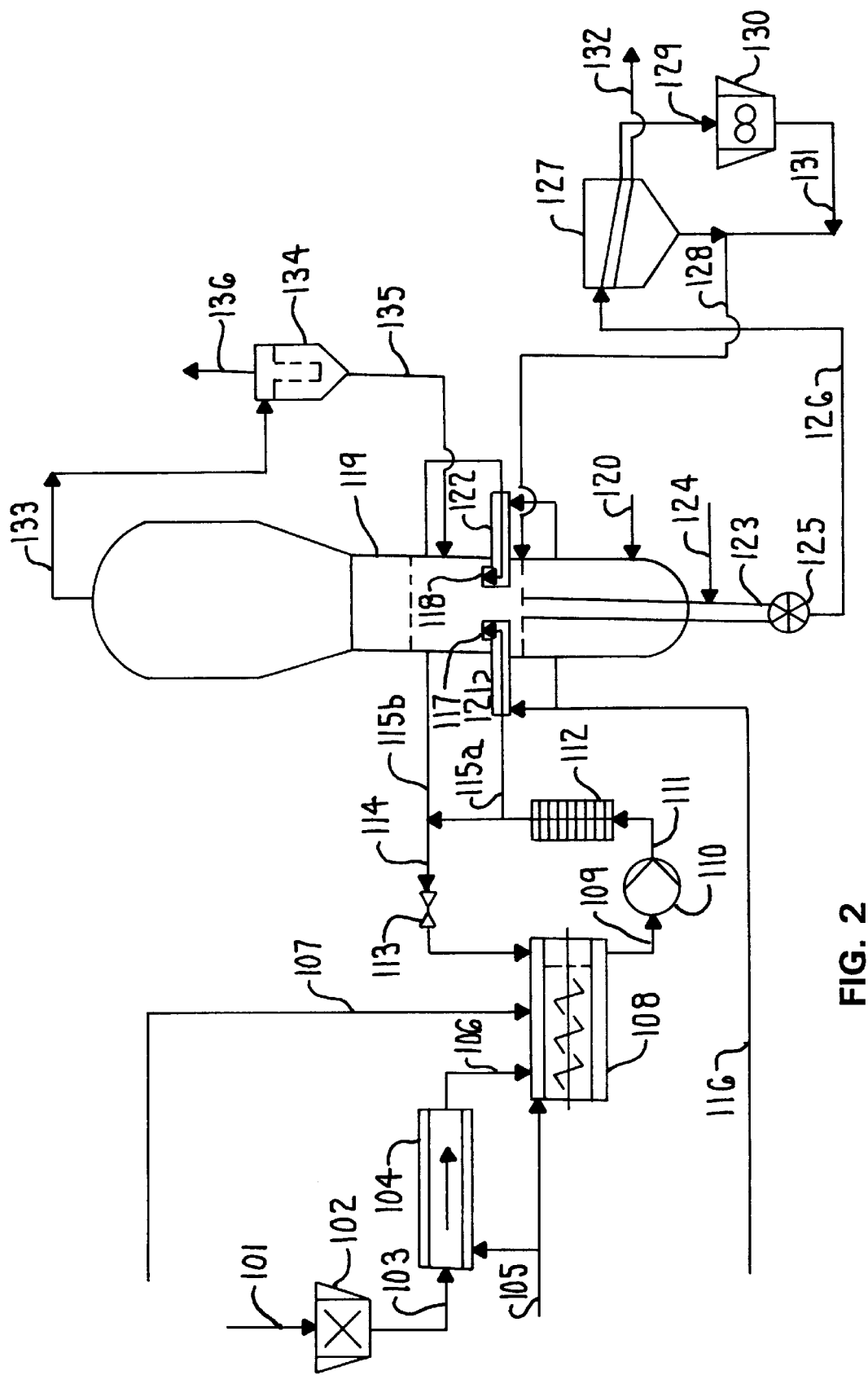
FIG. 2 is a flow chart of another embodiment of the present invention.

The process variation according to Example 3 corresponds with the process shown in FIG. 2.

507 kg/h commercially available ammonium sulfate crystals (particle size 0.1 to 1.0 mm) are fed through the line 101 to the pinned disk mill 102 and milled there into a mean particle size of 95 μm. The ammonium sulfate particles are sent through the line 103 to the heating screw conveyor 104 where they are heated to 135° C. with steam from the line 105. The ammonium sulfate particles arriving at the mixer 108 through the line 106 are mixed with the prilled urea fed through the line 107. The solid urea melts in the presence of ammonium sulfate by heat supply to the mixer.

The molten urea suspension having a temperature of 130° C. is conveyed by the pump 110 through the line 109 and the line 111 to the dispergator 112 where viscosity is reduced to 100 cP by introducing shear force between the standing and rotating pins so that the molten urea suspension becomes slightly liquid.

The molten urea suspension is fed through the line 115a or 115b to two full cone nozzles 117 and 118 having a capacity of 505.5 kg/h each. By means of the pressure control valve 113 in the line 114 an admission pressure of 3 bar is adjusted. The nozzles 117 and 118 spray the molten urea suspension into the fluidized bed of the granulator 119 with a velocity of 29 m/s (measured at a distance of 10 cm from the nozzle outlet opening) at a spraying angle of 70 degrees, while mists with a mean diameter of 410 μm are produced. The mists are injected from below into a fluidized bed arranged 450 mm above the nozzles. By feeding 10,500 Nm³/h ground air through the duct 120, the fluidized bed is generated at an empty tube velocity of 1.9 m/s. The nozzles 117 and 118 are arranged in the spouting air pipes 121 and 122 where 550 Nm³/h spouting air each are blown into the nozzles through the line 116 at an empty tube velocity of 28 m/s in order to loosen the fluidized bed in the place where the nozzles are arranged.

Finished granules are delivered through the delivery line 123 arranged in the center. Air is injected into this delivery line through the line 124 and granules with a mean particle size of 3.0 mm are delivered at an air rate of 560 Nm³/h. The granules are sent through the rotary valve 125 and the chute 126 to the screen 127 where the products are divided into three fractions. 80 kg/h fine products <1 mm are returned to the granulator 119 through the conveyor gallery 128. 40 kg/h oversize products >5 mm are fed to the crusher 130 through the line 129 and milled there into a mean diameter of 2 mm. The milled products are returned to the granulator through the lines 131 and 128 and form the fluidized bed there.

The finished products (1,001 kg/h) with an ammonium sulfate content of 50 wt. % are conveyed from the plant through the line 132 and stored after hydrophobic treatment with an oil/paraffin mixture. The waste air generated in the granulator 119 is sent through the line 133 to the bag filter 134 where dust particles >50 μm are separated. 150 kg/h dust having a concentration of 85 wt. % ammonium sulfate are returned to the granulator 119 at 250 mm below the top of the fluidized bed through the line 135. 10 kg/h dust <50 μm having a concentration of 60 wt. % ammonium sulfate emitted from the bag filter 134 through the line 136 are sent to the wet scrubber not shown.

Having described our invention as related to the present embodiments, it is our intention that the invention not be limited by any of the details of the description, unless otherwise specified, but rather be construed broadly within its spirit and scope as set out in the accompanying claims.

What we claim is:

1. A process for producing fertilizer granules containing urea and ammonium sulfate and having an ammonium sulfate concentration ≦60 wt. %, comprising the steps of: forming a molten urea suspension consisting of ammonium sulfate having an average particle size of 30 to 300 μm and urea having a temperature range of 120 to 155° C.; forming a fluidized bed of fine urea/ammonium sulfate particles in a fluidized bed reactor; injecting the molten urea suspension upwardly into the fluidized bed in an injection area while maintaining air flow into the injection area to loosen the fluidized bed, performing granulation and forming fertilizer granules and inadvertent dust; dividing the dust by dry separation into a fine ammonium sulfate lean fraction and a coarse ammonium sulfate rich fraction and returning the coarse ammonium sulfate rich fraction to the fluidized bed and/or uniting the coarse ammonium sulfate rich fraction with the molten urea suspension after wet-milling the coarse ammonium sulfate particles prior to granulation; separating the fertilizer granules generated in the fluidized bed; and, if necessary, treating the separated fertilizer granules.

2. The process according to claim 1, wherein the ammonium sulfate has an average particle size of 60 to 180 μm.

3. The process according to claim 1, wherein the molten urea suspension is produced by injecting and dispersing preheated ammonium sulfate into molten urea.

4. The process according to claim 1, wherein the molten urea suspension is produced by injecting preheated coarse particles of ammonium sulfate into the molten urea as well as the coarse ammonium sulfate particles subjected to milling by means of a wet mill and dispersed therein.

5. The process according to claim 4, wherein the coarse particle ammonium sulfate has an average size of 0.1 to 2.0 mm before wet milling.

6. The process according to claim 3, wherein preheated ammonium sulfate having a temperature of 100 to 160° C. is injected into the molten urea.

7. The process according to claim 1, wherein molten urea having a concentration of ≧98 wt. % is used.

8. The process according to claim 1, wherein highly turbulent dispersing of ammonium sulfate in the molten urea takes place.

9. The process according to claim 1, wherein the fine urea/ammonium sulfate particles have an average particle size of 1.0 to 3.0 mm.

10. The process according to 1, wherein a single-material nozzle is used to inject the molten urea suspension.

11. The process according to claim 1, wherein molten urea suspension having an average mist size of 250 to 500 $\mu$m is injected into the fluidized bed.

12. The process according to claim 1, wherein the molten urea suspension is atomized and injected into the fluidized bed by means of a full cone single-material nozzle with a spray angle of 45 to 90°.

13. The process according to claim 10, wherein the single-material nozzle is supplied with 100 to 1,000 kg/h molten urea suspension.

14. The process according to claim 1, wherein the fluidized bed has a height of 300 to 600 mm.

15. The process according to claim 10, wherein the molten urea suspension is covered with the air flow in the single-material nozzle.

16. The process according to claim 15, wherein the air flow has a velocity adjusted to 0.75 to 1.5 times that of the molten urea suspension.

17. The process according to claim 15, wherein the air flows at a rate of 0.75:1 to 1.6:1 $Nm^3$ air per kg molten urea suspension.

18. The process according to claim 1, wherein the separated fertilizer granules are divided into three fractions, undersize granules <1.0 mm, normal size granules 1.0 to 5.0 mm, and oversize granules >5 mm, and the undersize granules are recycled to the fluidized bed, the normal size granules are further processed and the oversize granules are crushed, if necessary, with a part of the normal size granules and returned together with undersize granules to the fluidized bed.

19. The process according to claim 18, wherein the undersize or crushed oversize granules are returned to the granulator under the top of the fluidized bed.

20. The process according to claim 18, wherein the normal size granules are subjected to hydrophobic treatment.

21. The process according to claim 1, wherein the fine ammonium sulfate lean dust fraction has an ammonium sulfate content of <60 wt. % and a particle size of <50 $\mu$m.

22. The process according to claim 1, wherein the ammonium sulfate lean fraction is removed in a subsequent wet scrubber.

23. The process according to claim 1, wherein the ammonium sulfate rich fraction having an ammonium sulfate content of >60 wt. % and a particle size of >50 $\mu$m is returned to the granulator under the top of the fluidized bed.

24. The process according to claim 1, wherein the ammonium sulfate rich fraction is subjected to wet milling to obtain a mean particle size of 30 to 300 $\mu$m, before being united with the urea/ammonium sulfate suspension.

25. The process according to claim 1, wherein the ammonium sulfate concentration in the fertilizer granules containing urea and ammonium sulfate is adjusted to 30 to 60 wt. %.

* * * * *